(12) United States Patent
Wu et al.

(10) Patent No.: US 11,868,238 B2
(45) Date of Patent: Jan. 9, 2024

(54) METHOD AND APPARATUS FOR FUZZ TESTING BASED ON RESOURCE ACCESS FEEDBACK

(71) Applicant: Samsung Electronics Co., Ltd., Suwon-si (KR)

(72) Inventors: Hongze Wu, Xi'an (CN); Jianyun Qu, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/336,360

(22) Filed: Jun. 2, 2021

(65) Prior Publication Data
US 2021/0397543 A1     Dec. 23, 2021

(30) Foreign Application Priority Data

Jun. 18, 2020   (CN) ......................... 202010558216.5
Mar. 15, 2021   (KR) ......................... 10-2021-0033539

(51) Int. Cl.
    G06F 11/36        (2006.01)
(52) U.S. Cl.
    CPC ...... G06F 11/3684 (2013.01); G06F 11/3688 (2013.01)
(58) Field of Classification Search
    CPC ........................................... G06F 11/36–3696
    See application file for complete search history.

(56) References Cited

U.S. PATENT DOCUMENTS

| 7,873,945 | B2 | 1/2011 | Musuvathi et al. |
| 9,405,706 | B2 | 8/2016 | Doshi et al. |
| 2009/0007077 | A1 | 1/2009 | Musuvathi et al. |
| 2016/0092373 | A1 | 3/2016 | Doshi et al. |
| 2018/0232238 | A1 | 8/2018 | Jiang |
| 2018/0247057 | A1 | 8/2018 | Melski et al. |

FOREIGN PATENT DOCUMENTS

| CN | 106557412 A | 4/2017 |
| CN | 111124926 A | 5/2020 |

OTHER PUBLICATIONS

Wen, C., et al., "MemLock: Memory Usage Guided Fuzzing", 42nd Int'l Conf. on Software Engineering [online], May 2020 [retrieved Jun. 18, 2022], Retrieved from Internet: <URL: https://dl.acm.org/doi/pdf/10.1145/3377811.3380396>, pp. 765-777.*
Wen, C., et al., MemLock: Memory Usage Guided Fuzzing (README.md), Github [online], Apr. 12, 2020 [retrieved Oct. 31, 2022], Retrieved from Internet: <URL: https://github.com/ICSE2020-MemLock/MemLock/tree/656bcae9050de551453dcfe45e3506cf5f2950c6>, whole document.*

(Continued)

*Primary Examiner* — Todd Aguilera
(74) *Attorney, Agent, or Firm* — NSIP Law

(57) ABSTRACT

A method includes receiving a test input, obtaining a resource access feedback indicating an access for a resource based on the test input, selectively, based on the resource access feedback indicating whether a first-time accessed resource is accessed based on the test input, adding the test input to a test input queue, and performing a fuzz test based on the test input queue with the test input.

19 Claims, 7 Drawing Sheets

(56) References Cited

OTHER PUBLICATIONS

Coppik, N., et al., MemFuzz: Using Memory Acesses to Guide Fuzzing, 12th IEEE Conf. on Software Testing, Validation adn Verification, 2019 [retrieved Dec. 5, 2022], Retreived from Internet: <URL: https://ieeexplore.ieee.org/stamp/stamp.jsp?arnumber=8730159>, pp. 48-58.*

Chinese Office Action dated Sep. 22, 2023, in counterpart Chinese Patent Application No. 202010558216.5 (12 pages in English, 10 pages in Chinese).

* cited by examiner

```
funV(char*input)
{
 ......
   char lvar[1000];
   strcpy(lvar,input);
 ......
}
```

FIG. 1
(RELATED ART)

```
           9010                                        9020
Resource  | 0 | 0 | 0 | 0 | 0 | 0 | 0 | 0 | 0 | 0 |
group W
            1   2   3   4   5   6   7   8   9   10
```

FIG. 5

```
                0x8040         0x8043
              |  0  |  0  |  0  |  0  |
                 1     2     3     4
                0x8040         0x8043
First execution | 0 | 1 | 1 | 0 |
                  1   2   3   4
                0x8040         0x8043
Second execution| 0 | 1 | 1 | 0 |
                  1   2   3   4
                0x8080                             0x8087
              | 0 | 1 | 1 | 0 | 0 | 0 | 0 | 0 |
                1   2   3   4   5   6   7   8
                0x8080                             0x8087
Third execution | 1 | 1 | 1 | 0 | 0 | 0 | 0 | 0 |
                  1   2   3   4   5   6   7   8
```

FIG. 6

METHOD AND APPARATUS FOR FUZZ TESTING BASED ON RESOURCE ACCESS FEEDBACK

CROSS-REFERENCE TO RELATED APPLICATIONS

This application claims the benefit under 35 USC § 119(a) of Chinese Patent Application No. 202010558216.5 filed on Jun. 18, 2020, in the China National Intellectual Property Administration, and Korean Patent Application No. 10-2021-0033539 filed on Mar. 15, 2021, in the Korean Intellectual Property Office, the entire disclosures of which are incorporated herein by reference for all purposes.

BACKGROUND

Field

The following description relates to a method and apparatus for fuzz testing in computer science.

Description of Related Art

Fuzz testing is a method of providing unexpected inputs to a target system and monitoring abnormal results to detect software vulnerabilities. Fuzz testing finds any possible program errors by providing a combination of at least one of invalid, unexpected, or random data as inputs to a program and monitoring program abnormalities such as crashes, failing built-in code assertions, potential memory leaks, or log exceptions.

Currently, fuzz testing can be divided into three categories, black-box testing, white-box testing, and grey-box testing. Grey-box testing is a type of testing between white-box testing and black-box testing, also referred to as coverage-induced mutational fuzz testing, and focuses on the program's internal situation as well as the accuracy of outputs and inputs. Grey-box testing is not as detailed and complete as white-box testing, but focuses on the internal logic of a program more than black-box testing does, and occasionally determines internal operation states through some representative phenomena, events, and signs. For example, grey-box testing may detect whether there is code coverage.

Current grey-box testing may generate a new test case by changing an input seed. For example, grey-box testing uses program instrumentation to tracks code coverage generated by inputs while a target system runs, and a fuzz manager uses the generated code coverage to determine inputs to be added to an input sequence, whereby the code coverage improves. For example, if a new execution path can be generated by an input, the input is maintained; otherwise, the input is deleted. Fuzz processing using such a continuous loop method contributes more input use cases.

However, high code coverage does not always find real vulnerabilities. In practice, most paths are irrelevant to security issues, and software vulnerabilities are generally caused by the incorrect use of a security-sensitive function (for example, strcpy( ) similar to a memory task). That is, the real vulnerabilities are actually hidden in the execution paths of some memory operation functions including strcpy( ). However, there are thousands of possible input combinations capable of reaching the execution paths. However, if grey-box testing guided by the existing code coverage reaches a designated execution path, other inputs capable of reaching the path are discarded. Thus, the existing grey-box testing will lose a vulnerability hidden in the path or degrade to black-box testing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented fuzz testing method performed by a fuzz testing apparatus, the fuzz testing method including receiving a test input, obtaining a resource access feedback indicating an access for a resource based on the test input, and determining whether to add the test input to a test input queue based on the resource access feedback.

The fuzz testing method may include determining a code line to be executed by the fuzz testing apparatus based on the test input, wherein the determining of whether to add the test input to the test input queue may include determining whether to add the test input to the test input queue according to the resource access feedback, in response to a new code line not being generated by the code line to be executed by the fuzz testing apparatus.

The fuzz testing method may include determining a code line to be executed by the fuzz testing apparatus based on the test input, and adding the test input to the test input queue, in response to a new code line being generated by the code line to be executed by the fuzz testing apparatus.

The obtaining of the resource access feedback may include obtaining a resource group comprising a resource requested by the fuzz testing apparatus to process the test input, obtaining a resource identification code corresponding to the resource group, obtaining an access identification code corresponding to the resource identification code, grouping the access identification code and the corresponding resource identification code as an identification pair, verifying a presence of a first-time accessed resource from among resources corresponding to the identification pair, generating a resource access feedback indicating a new resource may be accessed in response to a first-time accessed resource being present, and generating a resource access feedback indicating a new resource may be not accessed, in response to first-time accessed resource being absent, wherein the resource identification code may be configured to identify a position of a resource request program instruction, and wherein the access identification code may be configured to identify a position of a resource access program instruction.

The grouping may include adding the test input to the test input queue, in response to the resource access feedback indicating a new resource is accessed, and not adding the test input to the test input queue, in response to the resource access feedback indicating a new resource is not accessed.

The fuzz testing method may include determining an address section to be accessed when executing a program instruction of resource access identified by an access identification code corresponding to the identification pair, in response to the new resource being accessed, and generating an alert signal indicating an abnormality, in response to the determined address section not being between a start address and an end address of the resources corresponding to the identification pair.

The resource may include any one or any combination of a memory, a connection of a network connection pool, a pixel of an image, a node of a graph, and an edge of a graph.

The obtaining of the resource group may include obtaining the resource group, in response to determining that a new code line is not generated during processing of the test input.

The fuzz testing method may include adding the test input to a test input queue, in response to verifying that a new code line is generated during processing of the test input.

In another general aspect, there is provided a fuzz testing apparatus including a processor configured to receive a test input, obtain a resource access feedback indicating an access for a resource based on the test input, and determine whether to add the test input to a test input queue based on the resource access feedback.

The processor may include a receiver configured to receive the test input, an obtainer configured to obtain the resource access feedback, and a determiner configured to determine whether to add the test input to a test input queue according to the resource access feedback.

The processor may include a code line determiner configured to determine a code line to be executed by the fuzz testing apparatus based on the test input, wherein the determiner may be configured to determine whether to add the test input to the test input queue according to the resource access feedback, in response to a new code line not being generated by the code line to be executed by the fuzz testing apparatus.

The processor may include a code line determiner configured to determine a code line to be executed by the fuzz testing apparatus based on the test input, wherein the determiner may be configured to add the test input to the test input queue, in response to a new code line being generated by the code line to be executed by the fuzz testing apparatus.

The obtainer may include a resource group obtainer configured to obtain a resource group comprising a resource requested by the fuzz testing apparatus to process the test input, a resource identification code obtainer configured to obtain a resource identification code corresponding to the resource group, an access identification code obtainer configured to obtain an access identification code corresponding to the resource identification code, an identification pair determiner configured to determine the obtained access identification code and the corresponding resource identification code as an identification pair, and a resource access determiner configured to verify a presence of a first-time accessed resource from among resources corresponding to the identification pair, and to generate a resource access feedback indicating a new resource is accessed in response to g a first-time accessed resource being present, and to generate a resource access feedback indicating a new resource is not accessed in response to first-time accessed resource being absent, wherein the resource identification code may be configured to identify a position of a resource request program instruction, and the access identification code may be configured to identify a position of a resource access program instruction.

The determiner may be configured to add the test input to the test input queue in response to the resource access feedback indicating a new resource is accessed, and to not add the test input to the test input queue in response to the resource access feedback indicating a new resource is not accessed.

The fuzz testing apparatus may include a section determiner configured to determine an address section to be accessed when executing a program instruction of resource access identified by an access identification code corresponding to the identification pair, in response to the new resource being accessed, and an alerter configured to generate an alert signal indicating an abnormality in response to the determined address section not being between a start address and an end address of the resources corresponding to the identification pair.

The resource may include any one or any combination of a memory, a connection of a network connection pool, a pixel of an image, a node of a graph, and an edge of a graph.

Other features and aspects will be apparent from the following detailed description, the drawings, and the claims.

BRIEF DESCRIPTION OF THE DRAWINGS

FIG. 1 illustrates an example of a code for a failure in code coverage-based fuzz testing according to a related art.

FIG. 5 illustrates an example of a resource group.

FIG. 6 illustrates an example of determining whether there is a first-time accessed resource among resources corresponding to an identification pair by a fuzz testing apparatus.

Figure 2:
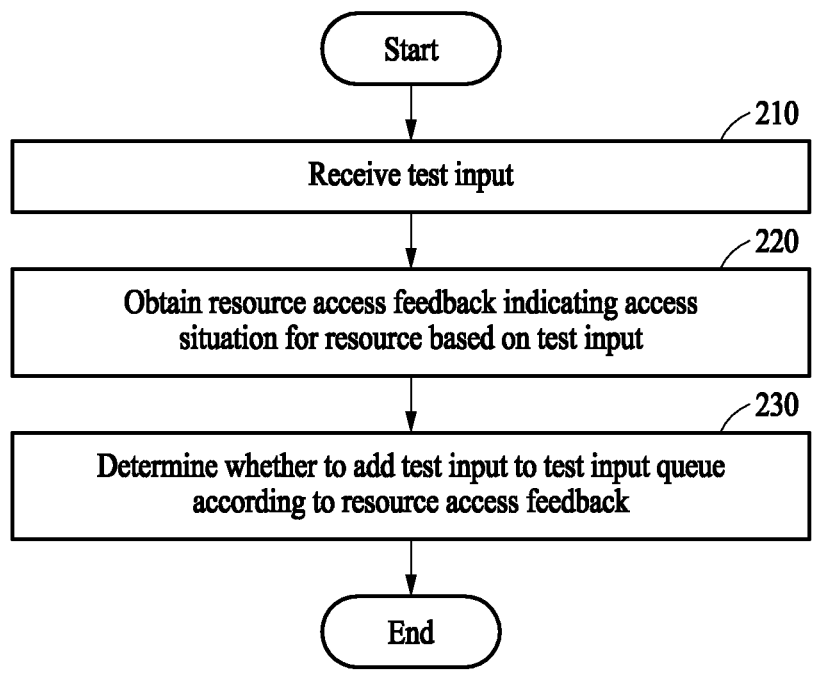
FIG. 2 is a diagram illustrating an example of fuzz testing by a fuzz testing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of first, second, A, B, (a), (b), may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 illustrates an example of a code for a failure in code coverage-based fuzz testing according to a conventional method.

Referring to FIG. 1, it is assumed that the rule of a seed mutation algorithm is to extend each input a designated length (for example, 100). When an input is 5 characters, the code of FIG. 1 is executed. If the following input is 105 characters, the code coverage-based fuzz testing (that is, grey cover testing) assumes that new code coverage is not generated by the execution and suspends the input extension. In practice, however, the code of FIG. 1 has a buffer overflow only when an input is more than 1000 characters. Therefore, the fuzz testing guided by the existing code coverage is invalid and degrades to black-box testing.

An example of a fuzz testing method and apparatus will be described with reference to FIGS. 2 to 9.

FIG. 2 is a diagram illustrating an example of fuzz testing by a fuzz testing apparatus. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions.

Referring to FIG. 2, in operation 210, a fuzz testing apparatus receives a test input.

Here, the fuzz testing apparatus refers to a target apparatus capable of finding a software vulnerability through fuzz testing, and the test input may be a combination of at least one of invalid, unexpected, or random data.

In operation 220, the fuzz testing apparatus obtains a resource access feedback during the execution of the fuzz testing apparatus based on the test input. Here, the resource access feedback represents an access situation of the fuzz testing apparatus with respect to a resource.

In this example, the execution process of the fuzz testing apparatus based on the test input may be construed as a grey-box testing process. However, examples are not limited to grey-box testing and other types of fuzz testing may be used.

Here, the resource may refer to a computing resource or external resource that can be accessed when a computer program runs and include, for example, a memory (for example, a combination of one or more global variables, heaps, and stacks), a connection of a network connection pool, a pixel of an image, a node of a graph, or an edge of a graph. However, examples are not limited thereto.

The resource access feedback may be used to indicate a result regarding whether there is a first-time accessed resource during the access to resources while the fuzz testing apparatus runs. For example, the resource access feedback is a feedback indicator. For example, the feedback indicator is "1" or "0". The feedback indicator of "1" indicates that there is a first-time accessed resource, and the feedback indicator of "0" indicates that there is no first-time accessed resource.

Operation 220 of obtaining the resource access feedback will be described further below with reference to FIG. 3.

Figure 3:
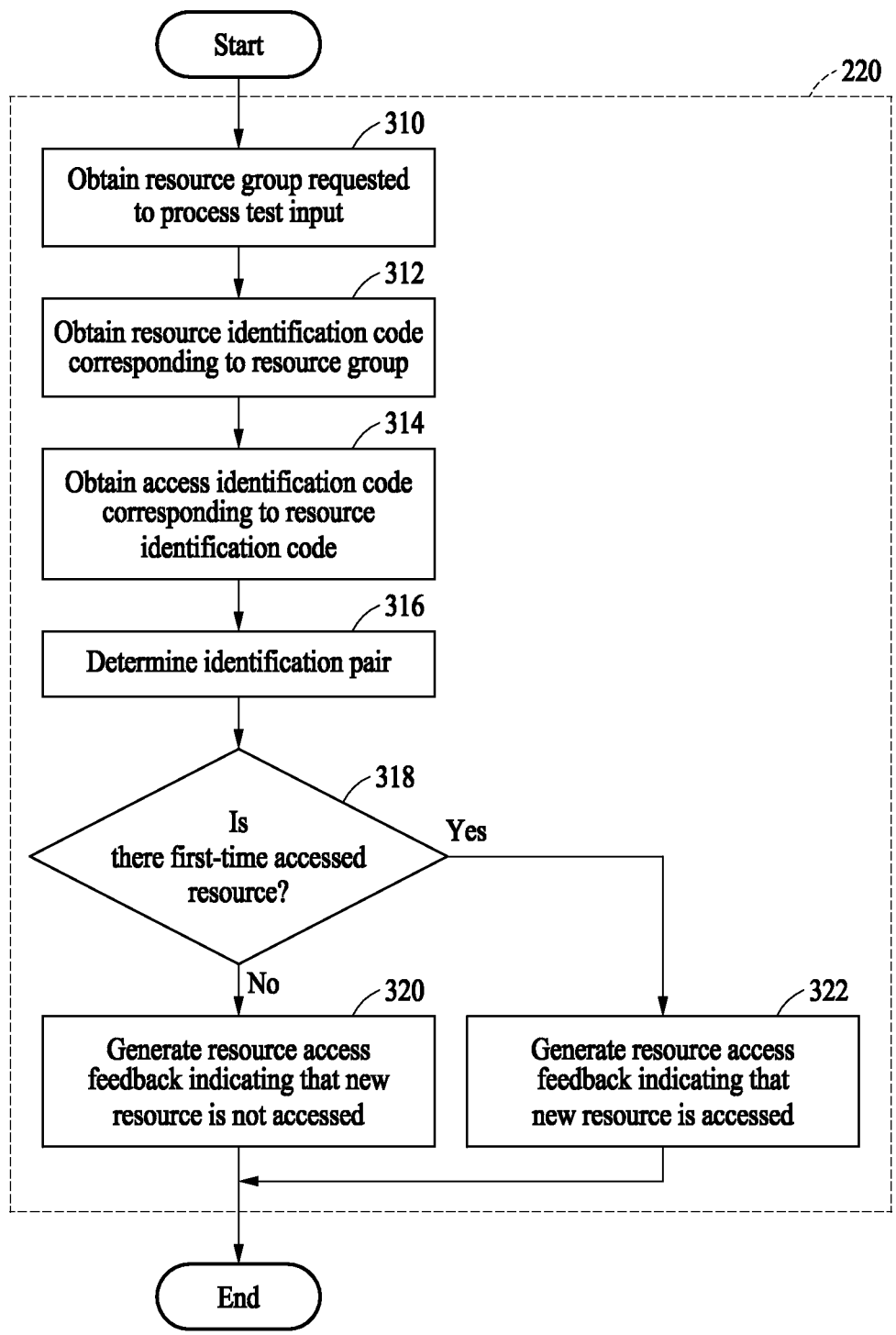
FIG. 3 is a diagram illustrating an example of obtaining a resource access feedback by a fuzz testing apparatus.

FIG. 3 is a diagram illustrating an example of obtaining a resource access feedback by a fuzz testing apparatus. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions.

Referring to FIG. 3, in operation 310, the fuzz testing apparatus obtains a resource group to process the test input. Here, the resource group includes at least one resource.

In an example, a plurality of resource request program instructions may be included during the test input processing process of the fuzz testing apparatus. In an example, a resource request program instruction may request one resource group. One resource group may be a set of resources requested by one resource request program instruction. In an example, each resource included in the resource group corresponds to an actual address (that is, absolute address), as shown in the example of FIG. 5.

FIG. 5 illustrates an example of a resource group.

Referring to FIG. 5, a resource group W may include resources in a section from a start address 9010 to an end address 9020.

In an example, resources requested by different resource request program instructions included in the test input processing process of the fuzz testing apparatus may be of different types, while resources included in a resource group requested by one resource request program instruction are of the same type.

Referring to FIG. 3 again, in operation 312, the fuzz testing apparatus obtains a resource identification code corresponding to the resource group. Here, the resource identification code is a code used to identify the position of the resource request program instruction. For example, if a resource request program instruction is "line 10: char *p1= (char*) malloc(10*sizeof(char));", a code used to identify the position of the resource request program instruction "line 10: char *p1=(char*) malloc(10*sizeof(char));" may be indicated as 5023. If a resource request program instruction is "line 11: char p2[10];", a code used to identify the position of the resource request program instruction "line 11: char p2[10];" may be indicated as 5024.

In addition, as an example, a code 8088 may be indicated at the position of the program instruction of the resource group requested to include the resources in the section from the start address 9010 to the end address 9020, and a code 8098 may be indicated at the position of a program instruction of a resource group requested to include resources in a section from a start address 9030 to an end address 9040. 8088 is the resource identification code corresponding to the resource group of the resources in the section from the start address 9010 to the end address 9020. 8098 is the resource identification code corresponding to the resource group of the resources in the section from the start address 9030 to the end address 9040.

In operation 314, the fuzz testing apparatus obtains an access identification code corresponding to the resource identification code.

Here, the access identification code is a code used to identify the position of a resource access program instruction. For example, if a resource access program instruction is "line 22: memset(dest, 0, 10)", a code used to identify the position of the resource access program instruction "line 22: memset(dest, 0, 10)" may be indicated as 507. If a resource access program instruction is "line 23: memset(dest, 0, 10)", a code used to identify the position of the resource access program instruction "line 23: memset(dest, 0, 10)" may be indicated as 508. If a resource access program instruction is "line 24: strcpy(dest, src)", a code used to identify the position of the resource access program instruction "line 24: strcpy(dest, src)" may be indicated as 509.

Further, in the example, resources in a section from the start address 9010 to an end address 9014 are included in the resource group including the resources in the section from the start address 9010 to the end address 9020. If there is a program instruction to access the resources in the section from the start address 9010 to the end address 9014, the position of the program instruction accessing the resources in the section from the start address 9010 to the end address 9014 may be indicated by a code 214. In other words, 214 is an access identification code corresponding to the resource identification code 8088.

As another example, resources in a section from a start address 9035 to an end address 9037 are included in the resource group including the resources in the section from the start address 9030 to the end address 9040. If there is a program instruction to access the resources in the section from the start address 9035 to the end address 9037, the position of the program instruction accessing the resources in the section from the start address 9035 to the end address 9037 may be indicated by a code 215. In other words, 215 is an access identification code corresponding to the resource identification code 8098.

Therefore, through the method described above, an access identification code corresponding to each resource identification code may be obtained during the fuzz testing process.

In operation 316, after obtaining the resource identification code and the access identification code corresponding to the resource identification code, the fuzz testing apparatus may determine the obtained access identification code and the corresponding resource identification code as one identification pair.

In an example, the resource identification code 8088 and the access identification code 214 may be recorded as one identification pair (8088, 214), and the resource identification code 8098 and the access identification code 215 may be recorded as one identification pair (8098, 215).

Here, the resource identification codes and the access identification codes are digital characters but are not limited thereto. In other examples, the resource identification codes and the access identification codes may be a combination of one or more letters of the English Alphabet, numbers, and punctuation marks.

In operation 318, the fuzz testing apparatus verifies whether a first-time accessed resource is present among the resources corresponding to the identification pair.

In response to the verification in operation 318 that there is a first-time accessed resource, the fuzz testing apparatus generates a resource access feedback indicating that a new resource is accessed, in operation 322.

In response to the verification in operation 318 that there is no first-time accessed resource, the fuzz testing apparatus generates a resource access feedback indicating that a new resource is not accessed, in operation 320.

In detail, after determining identification pairs, the fuzz testing apparatus may create and track access records of a resource group corresponding to each of the identification pairs. For example, it is assumed that there are two resource request program instructions a and b, and three resource access program instructions x, y, and z while the fuzz testing apparatus runs. A resource identification code that identifies the position of the resource request program instruction a is A, a resource identification code that identifies the position of the resource request program instruction b is B, a resource identification code that identifies the position of the resource access program instruction x is X, a resource identification code that identifies the position of the resource access program instruction y is Y, and a resource identification code that identifies the position of the resource access program instruction z is Z.

If the resource access program instruction y accesses a resource group requested by the resource request program instruction a and each of the resource access program instructions x, y, and z accesses a resource group requested by the resource request program instruction b, access records of the requested resource groups need to be tracked. For example, as shown in Table 1, access records of a resource group corresponding to a resource access instruction corresponding to an identification pair need to be tracked.

TABLE 1

| | Access identification code X | Access identification code Y | Access identification code Z |
|---|---|---|---|
| Resource identification code A | | ✓ | |
| Resource identification code B | ✓ | ✓ | ✓ |

In an example, in the case of the same identification pair, multiple executions of the same identification pair may be mapped to access records of the same resource group. For example, when the fuzz testing apparatus processes a test input, a resource request program instruction corresponding to a resource identifier and a resource access program instruction corresponding to an access identification code are executed multiple times, even millions of times, depending on different program designs and implementations. For example, the instructions may be executed multiple times when a test input is processed or when a plurality of test inputs is processed. For that reason, the actual addresses of resources requested and the actual addresses of resources accessed during the current execution of the same identification pair are not exactly the same as the actual addresses of resources requested and the actual addresses of resources accessed during the previous or following execution. However, because the identification pair is the same despite the multiple executions, the access records of the resource group only need to be created or tracked. In other words, whether there is a resource accessed by the fuzz testing apparatus for the first time among the resources corresponding to the identification pair may be determined.

To track the access records of the resource group corresponding to the identification pair, the fuzz testing apparatus may convert the absolute addresses (that is, actual addresses) of the resources included in the resource group to relative addresses. That is, the resources in the resource group may be numbered in order. For example, the resources in the resource group may be numbered, starting from "1", according to the length. Here, since the size of the resources requested by the resource request program instruction is variable, the length of the access records of the resource group may be limited to the maximum length of history.

Hereinafter, a method of determining whether a resource is accessed by the fuzz testing apparatus for the first time from among resources corresponding to an identification pair will be described in combination with specific examples.

FIG. 6 illustrates an example of determining whether a first-time accessed resource is present among resources corresponding to an identification pair by a fuzz testing apparatus.

Referring to FIG. 6, an identification pair, in which a resource identification code that identifies the position of a resource request program instruction a is A and a resource identification code that identifies the position of a resource access program instruction x is X, is (A, X). The resource request program instruction requests a resource group P, where "0" indicates that the corresponding resource is not accessed, and "1" indicates that the corresponding resource is accessed. In response to the first execution of the resource request program instruction a, four resources are requested, and the actual address section is from 0x8040 to 0x8043.

In response to the first execution of the resource access program instruction x, resource #2 and resource #3 are accessed. Because it is the first access, the access to resource #2 and resource #3 is triggered. In this example, since there are first-time accessed resources in the resource group P, a resource access feedback indicating that new resources are accessed may be generated.

In response to the second execution of the resource access program instruction x, resource #2 and resource #3 are accessed. However, since the two resources have been accessed when the resource access program instruction x was executed for the first time, access to a resource of a new number is not triggered. In other words, since there is no first-time accessed resource in the resource group P during the second execution of the resource access program instruction x, a resource access feedback indicating that a new resource is not accessed may be generated.

In response to the second execution of the resource request program instruction a, eight resources are requested, and the actual address section is from 0x8080 to 0x8087. In an example, the length of the previous resources may be increased from "4" to "8" since the resources requested in the first execution of the resource request program instruction a and the resource requested in the second execution of the resource request program instruction a have different actual addresses but belong to the same resource group P. In other words, the resource group P includes resources #1 to #8. In response to the third execution of the resource access program instruction x, resource #1 is accessed. Since a resource with a number "1" has never been accessed, access to the resource of the new number is triggered. In this example, since there is a first-time accessed resource in the resource group P, a resource access feedback indicating that a new resource is accessed may be generated.

Through the above method of verifying whether resources corresponding to an identification pair are accessed, the defect of inaccurate access verification caused by actual addresses and allocation length that are variable during the actual execution process is eliminated.

Referring to FIG. 2 again, in operation 230, the fuzz testing apparatus determines whether to add the test input to a test input queue according to the resource access feedback, for the next fuzz testing by the fuzz testing apparatus.

For example, assuming that a resource access feedback is a feedback indicator, the fuzz testing apparatus may determine whether to add the test input to the test input queue, for the next fuzz testing by the fuzz testing apparatus, by specifically checking the feedback indicator. For example, if the feedback indicator is "1", the feedback indicator indicates that there is a first-time accessed resource, meaning that the test input is available. Thus, the fuzz testing apparatus may add the test input to the test input queue for the next fuzz testing by the fuzz testing apparatus. If the feedback indicator is "0", the feedback indicator indicates that there is no first-time accessed resource, meaning that the test input is unavailable. Thus, the fuzz testing apparatus may abandon adding the test input to the test input queue for the next fuzz testing by the fuzz testing apparatus.

In an example, in relation to operation 230, whether the resource access feedback indicates that a new resource is accessed may be determined. If the resource access feedback indicates that a new resource is accessed, the test input is added to the test input queue to perform the next fuzz testing by the fuzz testing apparatus. If the resource access feedback indicates that a new resource is not accessed, the fuzz testing apparatus abandons the test input.

In related conventional methods, stack memory and heap memory are dynamically allocated (the former being allocated by a compiler, and the latter being allocated by a programmer). Therefore, if there are other operations in a program, the actual address range obtained may be changed, and the address change may be eliminated in the case of repeated accesses and/or multi-round testing by recording an access situation of an identification pair and corresponding resources.

As such, it can be learned that more vulnerabilities may be discovered deeply by selecting available input use cases and then performing in-depth testing on the same execution path based on the selected available input use cases through the method.

In addition, the fuzz testing method may further include monitoring whether the fuzz testing apparatus is abnormal (not shown in FIG. 2).

In an example, if the resource access feedback indicates that a new resource is accessed, an address section accessed when a program instruction of resource access identified by an access identification code corresponding to an identification pair is executed may be determined. If the determined address section is not between a start address and an end address of resources corresponding to the identification pair, an alert signal indicating that the fuzz testing apparatus is abnormal may be generated.

In an example, a resource group corresponding to a resource identification code 6900 of an identification pair (6900, 230) includes resources in a section from a start address 0x6542 to an end address 0x6548 and that an access identification code 230 corresponds to resources in a section from an access start address 0x6546 to an end address 0x6549. In this example, "0" indicates that the corresponding resource is not accessed, and "1" indicates that the corresponding resource is accessed. It may be learned that all the resources included in the resource group corresponding to the resource identification code 6900 are not accessed during the request (all the resources being indicated as "0") and that resources with addresses 0x6546 and 0x6547 are accessed (changed from "0" to "1") for the first time after an operation. In addition, among the resources corresponding to the resource identification code 6900, resources with addresses 0x6548 and 0x6549 are accessed. This indicates the address section ranging from 0x6546 to 0x6549 corresponding to the identification pair (6900, 230) does not belong to the address section ranging from 0x6542 to 0x6548, of the resource group corresponding to the resource identification code 6900, meaning that an issue of overflow (overflow or underflow) occurs in the process of accessing resources corresponding to an access identification code. Since the overflow leads to an abnormality of the fuzz testing apparatus, an alert signal indicating the abnormality of the fuzz testing apparatus may be sent.

Further, the fuzz testing apparatus adds a test input to a test input queue since a resource access feedback indicates that a new resource is accessed even when an overflow issue occurs during the process of accessing resources corresponding to an access identification code.

In an example, the fuzz testing method performed by the fuzz testing apparatus may further include releasing the resource group (not shown in FIG. 2).

In detail, in response to a resource release operation for at least one of one or more resource groups, the fuzz testing apparatus may release the at least one resource group. The fuzz testing apparatus may also optionally delete access records of a resource group corresponding to a resource access instruction pair corresponding to an identification pair. Through this method, it is possible to reuse memory.

In an example, the fuzz testing method performed by the fuzz testing apparatus may further include selecting a test input using a code coverage (not shown in FIG. 2).

The fuzz testing apparatus may determine a code line to be executed by the fuzz testing apparatus during the execution process of the fuzz testing apparatus based on the test input. If a new code line is generated, the fuzz testing apparatus may add the test input to the test input queue. If a new code line is not generated, the fuzz testing apparatus may determine whether to add the test input to the test input queue according to the resource access feedback. The fuzz testing apparatus may determine, through this method, whether the test input is an available test use case by combining the resource access feedback method based on the code coverage method, thereby improving the accuracy of test input determination.

During the execution process of the fuzz testing apparatus, obtaining the resource access feedback and determining whether a new code line is generated by the code line to be executed by the fuzz testing apparatus may be performed in an order that is not fixed.

If a new code line generated by the code line to be executed by the fuzz testing apparatus is obtained first, the fuzz testing apparatus may add the test input to the test input queue. If a resource access feedback is obtained first and the resource access feedback indicates that a new resource is accessed, the fuzz testing apparatus may add the test input to the test input queue. If it is determined first that a new code line is not generated by the code line to be executed by the fuzz testing apparatus, the fuzz testing apparatus may continue to obtain a resource access feedback and then determine whether to add the test input to the test input queue according to the resource access feedback.

As described above, the fuzz testing method may obtain available input use cases through the method of guiding fuzz testing using a resource access feedback, and perform in-depth testing on the same execution path based on the obtained available input use cases through the method, thereby discovering more vulnerabilities deeply.

Figure 4:
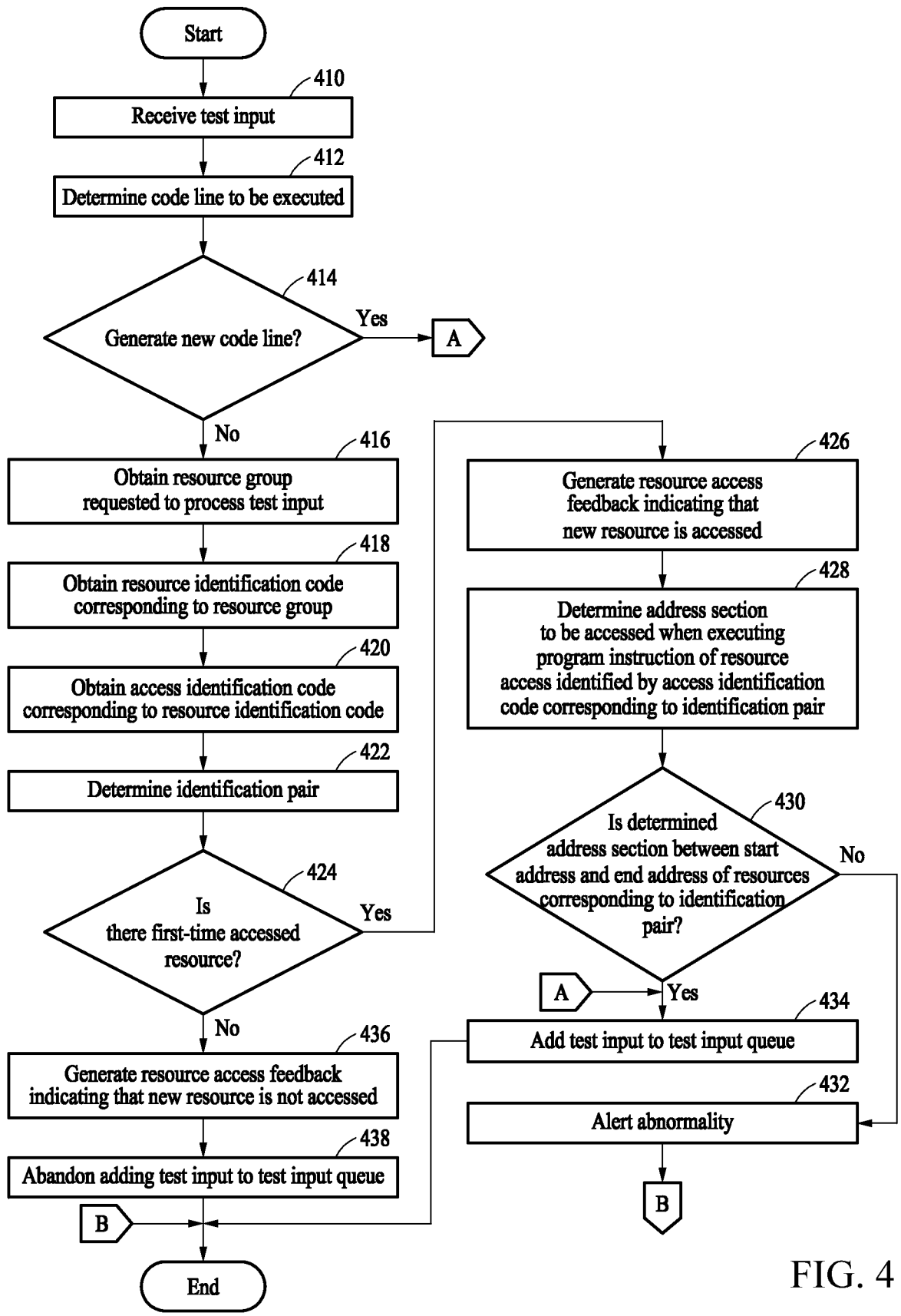
FIG. 4 is a diagram illustrating an example of fuzz testing by a fuzz testing apparatus.

FIG. 4 is a diagram illustrating an example of fuzz testing by a fuzz testing apparatus. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 and 5-6 are also applicable to FIG. 4, and are incorporated herein by reference. Thus, the above description may not be repeated here.

Referring to FIG. 4, in operation 410, a fuzz testing apparatus receives a test input. Here, the fuzz testing apparatus refers to a target apparatus capable of finding a software vulnerability through fuzz testing, and the test input may be a combination of at least one of invalid, unexpected, or random data.

In operation 412, the fuzz testing apparatus determines a code line to be executed by the fuzz testing apparatus during the execution process of the fuzz testing apparatus based on the test input.

In operation 414, the fuzz testing apparatus verifies whether a new code line is generated.

In response to the verification in operation 414 that a new code line is generated, the fuzz testing apparatus adds the test input to a test input queue, in operation 434.

In operation 414, when it is determined that a new code line is not generated, the fuzz testing apparatus obtains a resource group to process the test input, in operation 416. Here, the resource group includes at least one resource.

In operation 418, the fuzz testing apparatus obtains a resource identification code corresponding to the resource group. Here, the resource identification code is a code used to identify the position of the resource request program instruction.

In operation 420, the fuzz testing apparatus obtains an access identification code corresponding to the resource identification code. Here, the access identification code is a code used to identify the position of a resource access program instruction.

In operation 422, the fuzz testing apparatus may determine the obtained access identification code and the corresponding resource identification code as an identification pair.

In operation 424, the fuzz testing apparatus verifies whether there is a first-time accessed resource among the resources corresponding to the identification pair.

In operation 424, when it is determined that there is a first-time accessed resource, the fuzz testing apparatus generates a resource access feedback indicating that a new resource is accessed, in operation 426.

In operation 428, the fuzz testing apparatus determines an address section accessed when a program instruction of resource access identified by the access identification code corresponding to the identification pair is executed.

In operation 430, the fuzz testing apparatus verifies whether the determined address section is between a start address and an end address of resources corresponding to an identification pair.

In operation 430, when it is determined that the address section is not between the start address and the end address of resources corresponding to the identification pair, in operation 432, the fuzz testing apparatus generates an alert signal indicating an abnormality.

In operation 430, when it is determined that the address section is between the start address and the end address of resources corresponding to the identification pair, in operation 434, the fuzz testing apparatus adds the test input to the test input queue.

In operation 424, when it is determined that there is no first-time accessed resource, in operation 436, the fuzz testing apparatus generates a resource access feedback indicating that a new resource is not accessed.

In operation 438, the fuzz testing apparatus abandons adding the test input to the test input queue.

Hereinafter, an apparatus according to the present disclosure configured as described above will be described with reference to the drawings.

Figure 7:
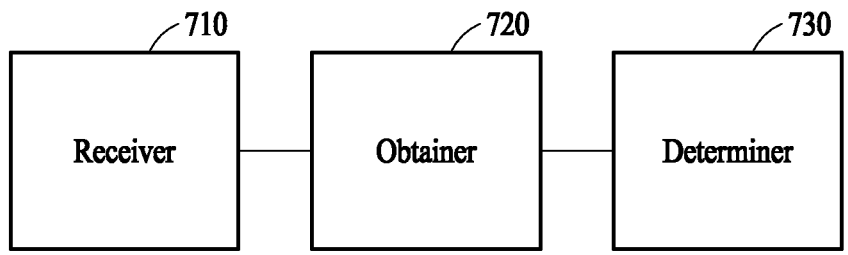
FIG. 7 illustrates an example of a configuration of a fuzz testing apparatus.

FIG. 7 illustrates an example of a configuration of a fuzz testing apparatus.

Referring to FIG. 7, a fuzz testing apparatus may include a receiver 710, an obtainer 720, and a determiner 730.

The receiver 710 receives a test input.

Here, the fuzz testing apparatus refers to an apparatus capable of finding a software vulnerability through fuzz testing, and the test input may be a combination of at least one of invalid, unexpected, or random data.

The obtainer 720 obtains a resource access feedback during the execution process of the fuzz testing apparatus based on the test input, wherein the resource access feedback indicates an access situation of the fuzz testing apparatus for a resource.

In an example, the execution process of the fuzz testing apparatus based on the test input may be construed as a grey-box testing process. However, it should be understood that the process performed herein is not limited to grey-box testing and may be other types of fuzz testing.

As an example, the resource may refer to a computing resource or external resource that can be accessed when a computer program runs and include, for example, a memory (for example, a combination of one or more global variables, heaps, and stacks), a connection of a network connection pool, a pixel of an image, a node of a graph, or an edge of a graph. However, examples are not limited thereto.

The resource access feedback may be used to indicate a result regarding whether there is a first-time accessed resource during the access to resources while the fuzz testing apparatus runs. For example, the resource access feedback may be a feedback indicator. For example, the feedback indicator is "1" or "0". The feedback indicator of "1" may indicate that there is a first-time accessed resource, and the feedback indicator of "0" may indicate that there is no first-time accessed resource.

Figure 8:
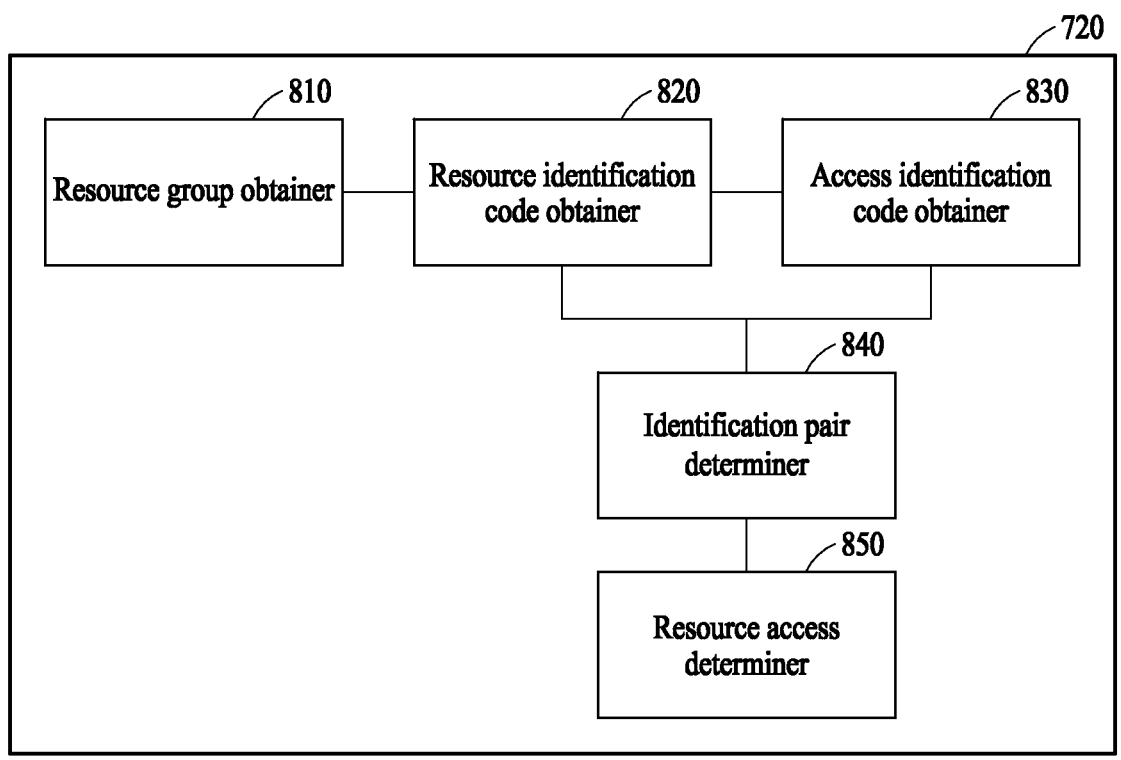
FIG. 8 illustrates an example of a configuration of an obtainer in a fuzz testing apparatus.

FIG. 8 illustrates an example of a configuration of an obtainer in a fuzz testing apparatus.

Referring to FIG. 8, the obtainer 720 may include a resource group obtainer 810, a resource identification code obtainer 820, an access identification code obtainer 830, an identification pair determiner 840, and a resource access determiner 850.

The resource group obtainer 810 obtains a resource group requested by the fuzz testing apparatus to process a test input. Here, the resource group includes at least one resource.

In an example, a plurality of resource request program instructions may be included during the test input processing process of the fuzz testing apparatus, and a resource request program instruction may request one resource group. One resource group may be a set of resources requested by one resource request program instruction, wherein each resource included in the resource group corresponds to an actual address, i.e., absolute address.

Further, resources requested by different resource request program instructions included in the test input processing process of the fuzz testing apparatus may be of different types, while resources included in a resource group requested by one resource request program instruction are of the same type.

The resource identification code obtainer 820 obtains a resource identification code corresponding to the resource group. Here, the resource identification code is a code used to identify the position of the resource request program instruction. For example, if a resource request program instruction is "line 10: char *p1=(char*) malloc(10*sizeof(char));", a code used to identify the position of the resource request program instruction "line 10: char *p1=(char*) malloc(10*sizeof(char));" may be indicated as 5023. If a resource request program instruction is "line 11: char p2[10];", a code used to identify the position of the resource request program instruction "line 11: char p2[10];" may be indicated as 5024.

In addition, as an example, a code 8088 may be indicated at the position of the program instruction of the resource group requested to include the resources in the section from the start address 9010 to the end address 9020, and a code 8098 may be indicated at the position of a program instruction of a resource group requested to include resources in a section from a start address 9030 to an end address 9040. 8088 is the resource identification code corresponding to the resource group of the resources in the section from the start address 9010 to the end address 9020. 8098 is the resource identification code corresponding to the resource group of the resources in the section from the start address 9030 to the end address 9040.

The access identification code obtainer 830 obtains an access identification code corresponding to the resource identification code. Here, the access identification code is a code used to identify the position of a resource access program instruction. For example, if a resource access program instruction is "line 22: memset(dest, 0, 10)", a code used to identify the position of the resource access program instruction "line 22: memset(dest, 0, 10)" may be indicated as 507. If a resource access program instruction is "line 23: memset(dest, 0, 10)", a code used to identify the position of the resource access program instruction "line 23: memset (dest, 0, 10)" may be indicated as 508. If a resource access program instruction is "line 24: strcpy(dest, src)", a code used to identify the position of the resource access program instruction "line 24: strcpy(dest, src)" may be indicated as 509.

In an example, resources in a section from the start address 9010 to an end address 9014 are included in the resource group including the resources in the section from the start address 9010 to the end address 9020. If there is a program instruction to access the resources in the section from the start address 9010 to the end address 9014, the position of the program instruction accessing the resources in the section from the start address 9010 to the end address 9014 may be indicated by a code 214. In other words, 214 is an access identification code corresponding to the resource identification code 8088.

As another example, resources in a section from a start address 9035 to an end address 9037 are included in the resource group including the resources in the section from the start address 9030 to the end address 9040. If there is a program instruction to access the resources in the section from the start address 9035 to the end address 9037, the position of the program instruction accessing the resources in the section from the start address 9035 to the end address 9037 may be indicated by a code 215. In other words, 215 is an access identification code corresponding to the resource identification code 8098.

Through a method similar to the method, an access identification code corresponding to each resource identification code may be obtained during the fuzz testing process.

After obtaining the resource identification code and the access identification code corresponding to the resource identification code, the identification pair determiner 840 determines the obtained access identification code and the corresponding resource identification code as one identification pair.

In the example, the resource identification code 8088 and the access identification code 214 may be recorded as one identification pair (8088, 214), and the resource identification code 8098 and the access identification code 215 may be recorded as one identification pair (8098, 215).

In the example, the resource identification codes and the access identification codes are digital characters but are not limited thereto. In an example, the resource identification codes and the access identification codes may be a combination of one or more letters of the English Alphabet, numbers, and punctuation marks.

The resource access determiner 850 is used to determine whether there is a first-time accessed resource among the resources corresponding to the identification pair. A resource access feedback indicating a new resource is accessed is generated if there is a first-time accessed resource, and a resource access feedback indicating a new resource is not accessed is generated if there is no first-time accessed resource.

Through the above method of verifying whether resources corresponding to an identification pair are accessed, the defect of inaccurate access verification caused by actual addresses and allocation length that are variable during the actual execution process is eliminated.

Referring to FIG. 7 again, the determiner 730 determines whether to add the test input to a test input queue according to the resource access feedback, for the next fuzz testing by the fuzz testing apparatus.

For example, assuming that a resource access feedback is a feedback indicator, the determiner 730 may determine whether to add the test input to the test input queue, for the next fuzz testing by the fuzz testing apparatus, by specifically checking the feedback indicator. For example, if the feedback indicator is "1", the feedback indicator indicates that there is a first-time accessed resource, meaning that the test input is available. Thus, the determiner 730 may add the test input to the test input queue. If the feedback indicator is "0", the feedback indicator indicates that there is no first-time accessed resource, meaning that the test input is unavailable. Thus, the determiner 730 may abandon adding the test input to the test input queue.

For example, the determiner 730 determines whether the resource access feedback generated by the resource access determiner 850 indicates that a new resource is accessed. If the resource access feedback indicates that a new resource is accessed, the determiner 730 adds the test input to the test input queue. If the resource access feedback indicates that a new resource is not accessed, the determiner 730 abandons the test input.

Conventionally, stack memory and heap memory are dynamically allocated (the former being allocated by a compiler, and the latter being allocated by a programmer). Therefore, if there are other operations in a program, the actual address range obtained may be changed, and the address change may be eliminated in the case of repeated accesses and/or multiple round testing by recording an access situation of an identification pair and corresponding resources.

As such, more vulnerabilities may be discovered deeply by selecting available input use cases and then performing in-depth testing on the same execution path based on the selected available input use cases through the method.

Further, the fuzz testing apparatus may further include a section determiner and an alerter (not shown in FIG. 7).

If the resource access feedback generated by the resource access determiner 850 indicates that a new resource is accessed, the section determiner is used to determine an address section to be accessed when executing a program instruction of resource access identified by an access identification code corresponding to the identification pair.

The alerter may generate an alert signal indicating that the fuzz testing apparatus is abnormal if the determined address section is not between a start address and an end address of the resources corresponding to the identification pair.

In an example, the fuzz testing apparatus may further include a code line determiner (not shown in FIG. 7) configured to determine a code line to be executed by the fuzz testing apparatus based on the test input.

If the code line determiner determines that a new code line is not generated by the code line to be executed by the fuzz testing apparatus, the determiner 730 may determine whether to add the test input to the test input queue according to the resource access feedback.

If the code line determiner determines that a new code line is generated by the code line to be executed by the fuzz testing apparatus, the determiner 730 may add the test input to the test input queue.

Various elements of the fuzz testing apparatus proposed herein may be implemented by hardware including a circuit having a physical structure to perform desired operations. For example, the desired operations may include code or instructions included in a program. The hardware-implemented fuzz testing apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

Figure 9:
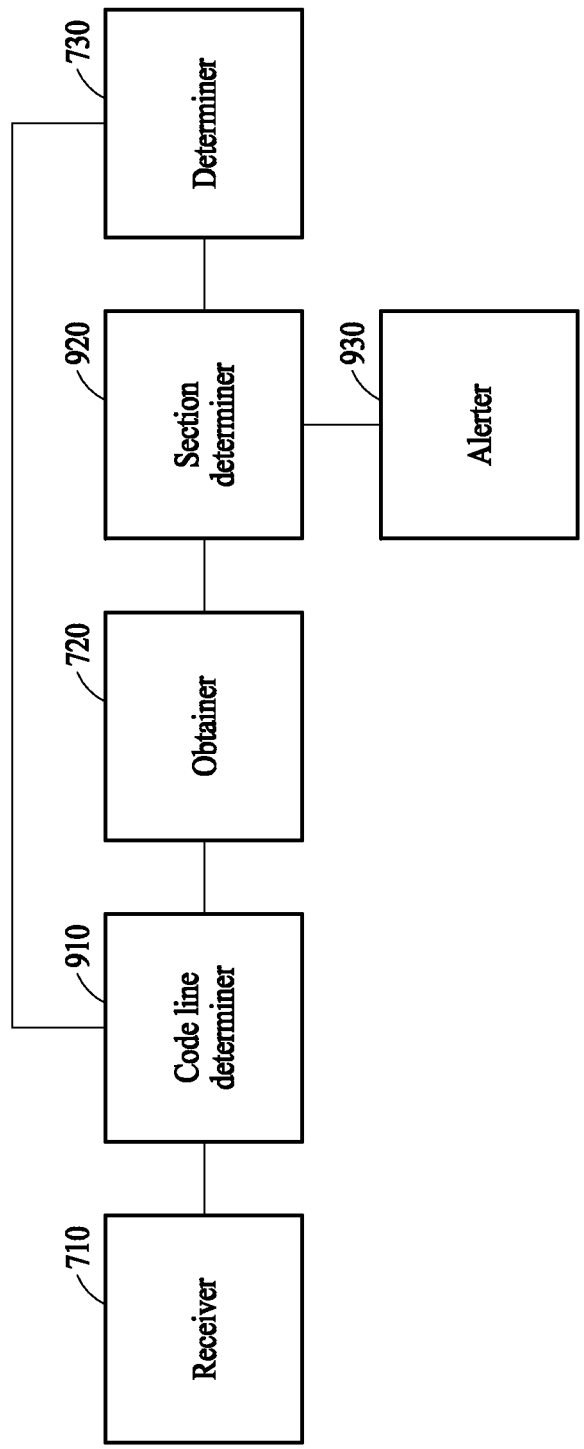
FIG. 9 illustrates an example of a configuration of a fuzz testing apparatus.

FIG. 9 illustrates an example of a configuration of a fuzz testing apparatus.

Referring to FIG. 9, the fuzz testing apparatus may include a receiver 710, an obtainer 720, a determiner 730, a code line determiner 910, a section determiner 920, and an alerter 930.

The receiver 710, the obtainer 720, and the determiner 730 of FIG. 9 are the same as those shown in FIG. 7. In addition to the description of FIG. 9 below, the descriptions of FIGS. 7-8 are also applicable to FIG. 9, and are incorporated herein by reference. Thus, the above description may not be repeated here The code line determiner 910 determine a code line to be executed by the fuzz testing apparatus based on the test input.

If the code line determiner 910 determines that a new code line is not generated by the code line to be executed by the fuzz testing apparatus, the determiner 730 may determine whether to add the test input to the test input queue according to a resource access feedback.

If the code line determiner 910 determines that a new code line is generated by the code line to be executed by the fuzz testing apparatus, the determiner 730 may add the test input to the test input queue.

If the resource access feedback generated by the resource access determiner 850 indicates that a new resource is accessed, the section determiner 920 is used to determine an address section to be accessed when executing a program instruction of resource access identified by an access identification code corresponding to the identification pair.

The alerter 930 may generate an alert signal indicating that the fuzz testing apparatus is abnormal if the determined address section is not between a start address and an end address of the resources corresponding to the identification pair.

The fuzz testing apparatus, receiver 710, obtainer 720, determiner 730, group obtainer 810, resource identification code obtainer 820, access identification code obtainer 830, identification pair determiner 840, resource access determiner 850, code line determiner 910, section determiner 920, section determiner, alerter, code line determiner, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the image processing method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented fuzz testing method performed by a fuzz testing apparatus, the fuzz testing method comprising:
   receiving a test input;
   determining an identification pair dependent on a position of a resource request program instruction and a position or position section of a resource access program instruction;
   verifying a presence of a first-time accessed resource from among resources corresponding to the identification pair;
   obtaining a resource access feedback indicating an access for a resource based on the test input;
   selectively, based on the resource access feedback, adding the test input to a test input queue; and
   performing fuzz testing based on the test input queue with the test input,
   wherein the resource access feedback indicates whether a new resource is accessed based on the test input, the new resource being the first-time accessed resource.

2. The fuzz testing method of claim 1, further comprising:
   determining whether a new code line is generated to be executed by the fuzz testing apparatus based on the test input,
   wherein, in response to a new code line not generated, add the test input to the test input queue according to the resource access feedback.

3. The fuzz testing method of claim 1, further comprising:
   determining a code line to be executed by the fuzz testing apparatus based on the test input; and
   adding the test input to the test input queue, in response to a new code line being generated by the code line to be executed by the fuzz testing apparatus.

4. The fuzz testing method of claim 1, wherein the obtaining of the resource access feedback comprises:
   obtaining a resource group comprising a resource requested by the fuzz testing apparatus to process the test input;
   obtaining a resource identification code corresponding to the resource group;
   obtaining an access identification code corresponding to the resource identification code;
   grouping the access identification code and the corresponding resource identification code as the identification pair;
   verifying a presence of the first-time accessed resource from among resources corresponding to the identification pair;

generating the resource access feedback indicating the new resource is accessed in response to the first-time accessed resource being present; and generating the resource access feedback indicating the new resource is not accessed, in response to the first-time accessed resource being absent, wherein the resource identification code is configured to identify a position of a resource request program instruction, and wherein the access identification code is configured to identify a position of a resource access program instruction.

5. The fuzz testing method of claim 4, wherein the grouping comprises:

adding the test input to the test input queue, in response to the resource access feedback indicating the new resource is accessed; and not adding the test input to the test input queue, in response to the resource access feedback indicating the new resource is not accessed.

6. The fuzz testing method of claim 4, further comprising:

determining an address section to be accessed when executing a program instruction of resource access identified by an access identification code corresponding to the identification pair, in response to the new resource being accessed; and generating an alert signal indicating an abnormality, in response to the determined address section not being between a start address and an end address of the resources corresponding to the identification pair.

7. The fuzz testing method of claim 4, wherein the obtaining of the resource group comprises obtaining the resource group, in response to determining that a new code line is not generated during processing of the test input.

8. The fuzz testing method of claim 4, further comprising adding the test input to the test input queue, in response to verifying that a new code line is generated during processing of the test input.

9. The fuzz testing method of claim 1, wherein the resource comprises any one or any combination of a memory, a connection of a network connection pool, a pixel of an image, a node of a graph, and an edge of a graph.

10. A non-transitory computer-readable storage medium storing instructions that, when executed by a processor, cause the processor to perform the fuzz testing method of claim 1.

11. A fuzz testing apparatus comprising:

a processor configured to:

receive a test input;

determine an identification pair dependent on a position of a resource request program instruction and a position or position section of a resource access program instruction;

verify a presence of a first-time accessed resource from among resources corresponding to the identification pair;

obtain a resource access feedback indicating an access for a resource based on the test input;

selectively, based on the resource access feedback, adding the test input to a test input queue; and performing fuzz testing based on the test input queue with the test input, wherein the resource access feedback indicates whether a new resource is accessed based on the test input, the new resource being the first-time accessed resource.

12. The fuzz testing apparatus of claim 11, wherein the processor is further configured to:

determine whether a new code line is generated to be executed by the fuzz testing apparatus based on the test input; and determine, in response to a new code line not generated, whether to add the test input to the test input queue according to the resource access feedback.

13. The fuzz testing apparatus of claim 11, wherein the processor is further configured to:

determine a code line to be executed by the fuzz testing apparatus based on the test input; and add the test input to the test input queue, in response to a new code line being generated by the code line to be executed by the fuzz testing apparatus.

14. The fuzz testing apparatus of claim 11, wherein the processor is configured to:

obtain a resource group comprising a resource requested by the fuzz testing apparatus to process the test input;

obtain a resource identification code corresponding to the resource group;

obtain an access identification code corresponding to the resource identification code;

determine the obtained access identification code and the corresponding resource identification code as the identification pair; and verify a presence of the first-time accessed resource from among resources corresponding to the identification pair, and to generate the resource access feedback indicating the new resource is accessed in response to the first-time accessed resource being present, and to generate the resource access feedback indicating the new resource is not accessed in response to the first-time accessed resource being absent, wherein the resource identification code is configured to identify a position of a resource request program instruction, and the access identification code is configured to identify a position of a resource access program instruction.

15. The fuzz testing apparatus of claim 14, wherein the processor is configured to:

add the test input to the test input queue in response to the resource access feedback indicating the new resource is accessed, and not add the test input to the test input queue in response to the resource access feedback indicating the new resource is not accessed.

16. The fuzz testing apparatus of claim 14, wherein the processor is further configured to:

determine an address section to be accessed when executing a program instruction of resource access identified by an access identification code corresponding to the identification pair, in response to the new resource being accessed; and generate an alert signal indicating an abnormality in response to the determined address section not being between a start address and an end address of the resources corresponding to the identification pair.

17. The fuzz testing apparatus of claim 11, wherein the resource comprises any one or any combination of a memory, a connection of a network connection pool, a pixel of an image, a node of a graph, and an edge of a graph.

18. The fuzz testing apparatus of claim 11, wherein the processor is configured to:

determine whether a new code line is generated to be executed by the fuzz testing apparatus based on the test input; and in response to the new code line being determined to not be generated:

perform the obtaining of the resource access feedback;

determine whether the resource access feedback indicates the new resource is accessed; and in response to the resource access feedback being determined to indicate that the new resource is not accessed select to not perform the addition and fuzz testing.

19. The fuzz testing method of claim 18, wherein, in response to the new code line being determined to not be generated, select to add the test input to the test input queue in response to the resource access feedback being determined to indicate the new resource is accessed, and perform the fuzz testing.

* * * * *